(12) United States Patent
Pozmantir et al.

(10) Patent No.: US 10,056,808 B2
(45) Date of Patent: Aug. 21, 2018

(54) BRUSHLESS DC MOTOR INCORPORATING SINGLE POLE DOUBLE THROW MAGNETIC SWITCH

(71) Applicants: Michael Pozmantir, Plano, TX (US); Sergey Pozmantir, Plano, TX (US)

(72) Inventors: Michael Pozmantir, Plano, TX (US); Sergey Pozmantir, Plano, TX (US)

(*) Notice: Subject to any disclaimer, the term of this patent is extended or adjusted under 35 U.S.C. 154(b) by 173 days.

(21) Appl. No.: 15/356,629

(22) Filed: Nov. 20, 2016

(65) Prior Publication Data

US 2018/0145565 A1    May 24, 2018

(51) Int. Cl.
| | |
|---|---|
| *H02K 11/215* | (2016.01) |
| *H02K 1/02* | (2006.01) |
| *H02K 1/14* | (2006.01) |
| *H02K 1/27* | (2006.01) |
| *H02K 3/28* | (2006.01) |
| *H02K 7/14* | (2006.01) |
| *H02K 11/33* | (2016.01) |
| *F04D 19/00* | (2006.01) |
| *F04D 25/06* | (2006.01) |
| *F04D 25/08* | (2006.01) |
| *H02K 21/16* | (2006.01) |
| *H02K 21/22* | (2006.01) |
| *H02P 1/00* | (2006.01) |

(52) U.S. Cl.
CPC ......... *H02K 11/215* (2016.01); *F04D 19/002* (2013.01); *F04D 25/068* (2013.01); *F04D 25/0646* (2013.01); *F04D 25/08* (2013.01); *H02K 1/02* (2013.01); *H02K 1/146* (2013.01); *H02K 1/2706* (2013.01); *H02K 1/2786* (2013.01); *H02K 3/28* (2013.01); *H02K 7/14* (2013.01); *H02K 11/33* (2016.01); *H02K 21/16* (2013.01); *H02K 21/222* (2013.01); *H02P 1/00* (2013.01); *H02K 2201/03* (2013.01)

(58) Field of Classification Search
CPC .......... H02K 11/215; H02K 7/14; H02K 3/28; H02K 1/2706; H02K 1/146; H02K 1/02; H02K 11/33; H02K 1/2786; H02K 11/20; F04D 25/0646; F04D 25/068; F04D 25/08; F04D 19/002
See application file for complete search history.

(56) References Cited

U.S. PATENT DOCUMENTS

| | | | |
|---|---|---|---|
| 2,753,471 A | 7/1956 | Henninger | |
| 3,297,891 A | 1/1967 | Foran | |
| 3,629,675 A * | 12/1971 | Porath | H02K 29/06 318/400.41 |
| 3,662,196 A | 5/1972 | Ruschmann | |

(Continued)

*Primary Examiner* — Michael C Zarroli

(57) ABSTRACT

A brushless DC motor utilizing a single pole double throw reed switch as a rotor position sensor. In one embodiment, the motor has a four-pole internal stator with bifilar windings providing alternating polarization for each subsequent pole, and a hollow outer rotor with radially magnetized ring-shaped permanent magnet. The rotor magnet has magnetically uninterrupted four-pole torque generating surface and incorporates features to interact with the reed switch. A non-uniform air gap between the stator poles and an inner surface of the rotor magnet allows generating a complementary reluctance torque between the energization pulses. The motor includes means to limit the electric current through the reed switch.

15 Claims, 4 Drawing Sheets

(56) References Cited

U.S. PATENT DOCUMENTS

| | | | | |
|---|---|---|---|---|
| 3,678,359 | A | | 7/1972 | Peterson |
| 3,806,785 | A | * | 4/1974 | DeValroger ............ H02K 29/12 |
| | | | | 318/400.02 |
| 3,873,897 | A | | 3/1975 | Muller |
| 3,900,780 | A | | 8/1975 | Tanikoshi |
| 4,030,005 | A | | 6/1977 | Doemen |
| 4,099,104 | A | | 7/1978 | Muller |
| 4,374,347 | A | | 2/1983 | Muller |
| 4,475,068 | A | | 10/1984 | Brailsford |
| 4,547,714 | A | | 10/1985 | Muller |
| 4,549,104 | A | | 10/1985 | Niimura |
| 4,591,766 | A | * | 5/1986 | Takaba ................... H02K 29/12 |
| | | | | 310/216.095 |
| 4,642,534 | A | | 2/1987 | Mitchell |
| 4,667,137 | A | * | 5/1987 | Macleod ................ H02K 29/08 |
| | | | | 310/68 R |
| 4,943,747 | A | * | 7/1990 | Lee ........................ H02K 29/08 |
| | | | | 310/186 |
| 5,001,375 | A | * | 3/1991 | Jones ..................... H02K 23/62 |
| | | | | 310/177 |
| 5,095,238 | A | | 3/1992 | Suzuki |
| 5,107,159 | A | * | 4/1992 | Kordik ................... H02K 1/146 |
| | | | | 310/156.44 |
| 5,329,195 | A | * | 7/1994 | Horber .................... H02K 3/28 |
| | | | | 310/68 B |
| 5,336,956 | A | * | 8/1994 | Haner ...................... H02K 3/28 |
| | | | | 310/179 |
| 7,884,580 | B2 | * | 2/2011 | Lee ........................ H02K 1/16 |
| | | | | 310/113 |
| 9,595,859 | B2 | * | 3/2017 | Dhawan ................. H02K 21/22 |

* cited by examiner

BRUSHLESS DC MOTOR INCORPORATING SINGLE POLE DOUBLE THROW MAGNETIC SWITCH

BACKGROUND—PRIOR ART

The present invention relates to pulse brushless direct current electric motors.

Brushless DC motors are widely used because they are stable, reliable, efficient, and require little or no maintenance. A typical brushless motor consists of a stator structure having a plurality of electromagnets, a permanent magnet rotor, and a sensor which controls the energization of the torque-creating stator electromagnets in pulses depending on the position of the rotor. Several types of brushless motors comprising this structure have been proposed—for example, in U.S. Pat. No. 3,873,987 (1975), U.S. Pat. No. 4,374,347 (1983), and U.S. Pat. No. 4,547,714 (1985), all to Muller, U.S. Pat. No. 4,030,005 to Doemen (1977), and U.S. Pat. No. 5,095,238 to Suzuki et al. (1992). All of these motors use semiconductor sensing elements based on the Hall Effect. While Hall Effect sensors are reliable and widely used in brushless motors, they have some disadvantages. They require additional electronic components, which complicates manufacturing and increases the cost of these motors. Also, additional circuitry and Hall generators themselves consume some electrical energy therefore decreasing the total efficiency of such motors, particularly noticeable in small electric motors working on low electric currents.

Other types of brushless motors using mechanical switching means that do not consume additional energy are also known from the prior art. Henninger in U.S. Pat. No. 2,753,471 (1956) shows a constant speed DC motor utilizing a vibratible switch with complex mechanical construction. The electrical contacts in this motor are exposed, which affects its life time and reliability. Better results in improving these parameters could be achieved in motors incorporating reed switches as rotor position sensors, where internal contacts are encapsulated in a glass tube filled with protective gas.

Several attempts to utilize advantages of reed switches in brushless motors were made, for example in U.S. Pat. No. 3,297,891 to Foran (1967), U.S. Pat. No. 3,662,196 to Ruschmann (1972), U.S. Pat. No. 3,678,359 to Peterson (1972), and U.S. Pat. No. 4,475,068 to Brailsford (1984). Although these motors in general have a smaller number of electrical components, all of them suffer from several disadvantages. They use a plurality of reed switches, sometimes even placed in an array. Additional magnets or shielding disks are needed to control reed switch activation which makes these motors mechanically complex.

Brushless motors incorporating reed switches are not widely used in the industry because of the common misconception of their lower reliability as compared to semiconductor sensors that have no mechanical parts. However, reed switches may provide reliable operation with an increased life time that can be comparable to the life time of Hall Effect sensors or other wearable motor components, such as bearings, when proper measures are taken to protect reed switch internal contacts from high currents and voltage spikes. All motors using reed switches heretofore known lack such measures.

Simple replacement of the Hall Effect sensor with a reed switch in any type of known brushless motor presents technical difficulties and is not obvious for any person with ordinary skills in the art. Hall Effect sensors interact with a continuous surface of the rotor magnets and provide different electric signal in the presence of South or North poles. It is known that motors with continuous magnetization of the rotor with alternating magnetic poles have improved efficiency due to better utilization of the magnets as compared to the rotors having unmagnetized regions. However, the reed switch is equally activated by any pole, therefore with a continuously magnetized rotor surface it will stay in one state despite the changes in magnetic field direction. Thus, a separate magnetic field must interact with the reed switch preserving the main uninterrupted torque generating rotor surface. It could require an extensive redesign of the rotor. Also, the electronic circuits of present brushless motors with semiconductor sensors need to be changed to provide low voltage applied to the reed switch contacts that should be electrically separated from motor windings. Additional measures are required to limit current through the reed switch. This current needs to be lower than a Hall Effect sensor supply current to achieve higher efficiency as compared to conventional technology.

SUMMARY

The present invention overcomes the aforementioned disadvantages by providing a highly efficient, reliable, simply constructed, and inexpensive brushless DC motor incorporating only one single pole double throw hermetic magnetic switch.

In accordance with one embodiment a brushless DC motor comprises a four-pole internal stator with bifilar windings, each pole having alternating polarization, a hollow outer rotor with radially magnetized ring-shaped permanent magnet, that magnet having a magnetically uninterrupted four-pole torque generating surface, and incorporating features to interact with a single pole double throw reed switch, that switch being a part of an electronic control circuit energizing stator windings in pulses, such circuit including components for limiting the electric current through the reed switch.

Accordingly, several advantages of one or more aspects are as follows: to provide a brushless DC motor with a simple construction, that is relatively inexpensive, that has improved efficiency as compared to conventional technology, that has reasonable reliability and life time, that is self-starting and provides relatively uniform torque. Other advantages and features of one or more aspects will be apparent from a consideration of the following detailed description and accompanying drawings, wherein similar numbers denote similar parts throughout the several views. The drawings and description are to be regarded as illustrative in nature, and not as restrictive. Some of the views may have some motor components not shown for clarity.

DETAILED DESCRIPTION OF THE INVENTION

Figure 1:
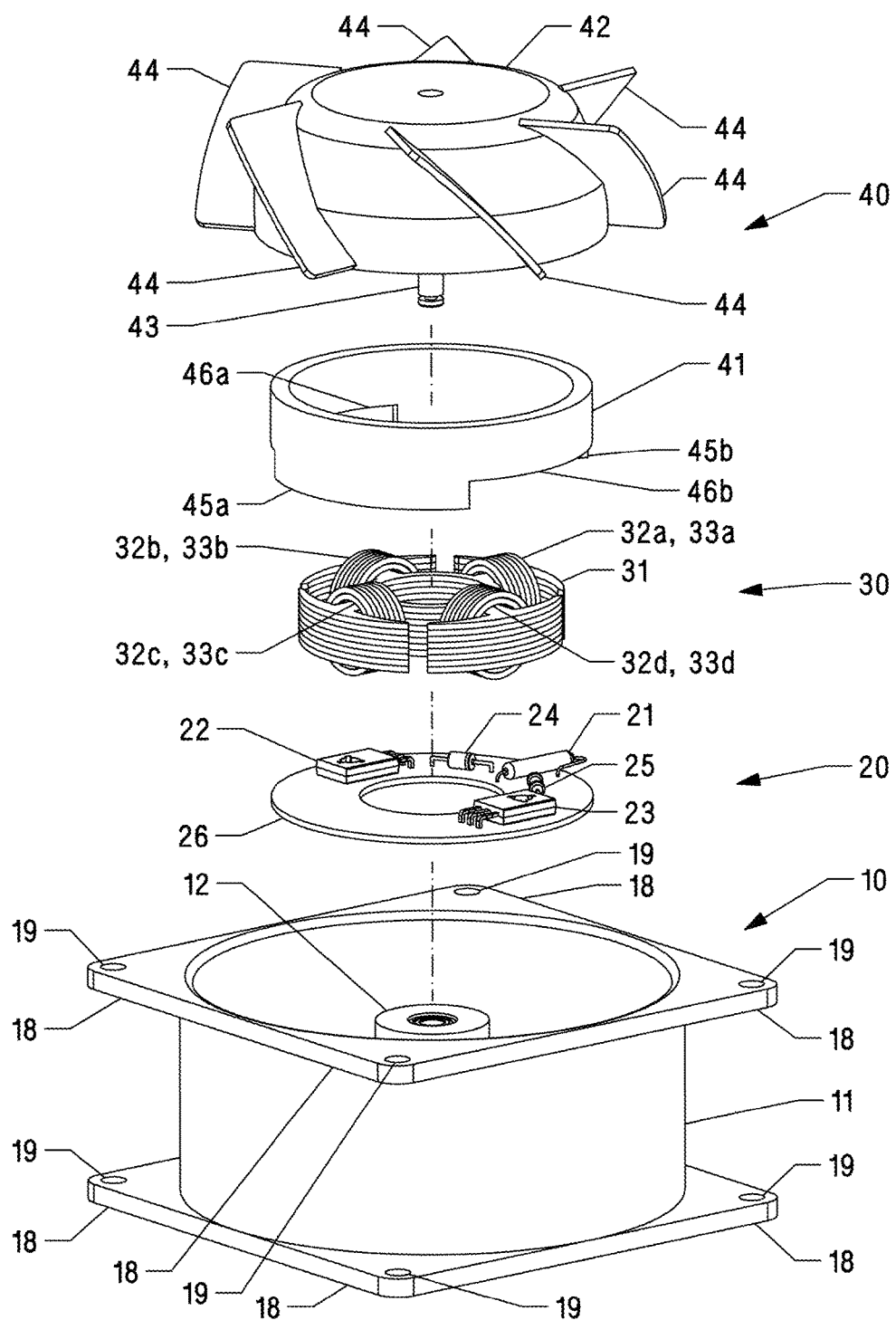
FIG. 1 is an exploded view illustrating main motor components of one embodiment of the present invention.
Figure 2:
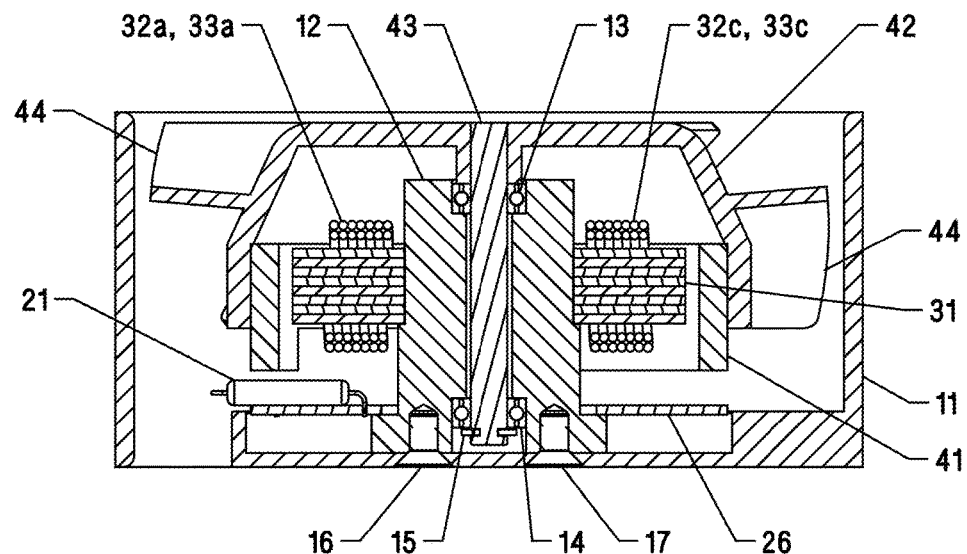
FIG. 2 is a cross-sectional view of the motor in assembled state taken along the axis of the shaft.

One embodiment of the motor is illustrated in FIG. 1 (three-dimensional exploded view showing main components) and FIG. 2 (cross-sectional view taken along the axis of the motor shaft). The motor consists of a casing assembly 10, a stator 30, a permanent magnet rotor 40, and a printed circuit board (PCB) 20 containing electronic control components.

A casing 11 is generally adapted to a hollow cylindrical configuration having four extending corner flanges 18 with mounting holes 19 on inlet and outlet sides. It can be manufactured from die-cast aluminum or plastic but other suitable materials could be used. A housing 12 is secured to the casing 11 by means of screws 16 and 17. The stator 30 consists of a plurality of stacked laminations 31 forming four identical poles of a customary T-shape, that are essentially umbrella or mushroom shaped, each pole extending circumferentially over an extended arc or sector, covering almost an entire quarter of a circle with narrow gaps between the poles. The stack of laminations 31 is formed with a central opening in which the housing 12 is fitted and permanently attached, and may be subjected to insulation by means of powder or resin coating while leaving outer circumference of the stator core laminations uncoated.

In accordance with the embodiment depicted on FIGS. 1, 2, all stator poles are wound in a bifilar form with two continuous parallel conductors, or filaments, alternating the direction of winding for each subsequent pole. The windings of each stator pole are shown as 32a to 32d for the first filament, and 33a to 33d for the second. Each conductor upon energization will create, for example, a sequence of North-South-North-South poles, and this pattern can be easily reversed to South-North-South-North by changing the direction of the electric current. Winding in a bifilar manner has the advantage that the number of turns per filament on any one pole winding will be identical. The conductors in windings 32a-32d and 33a-33d may be placed adjacent or above each other. For motors, operating under higher voltages, the windings may be separated but in this case the benefits of bifilar winding may not be realized.

A rotor shaft 43 is journaled by ball bearings 13 and 14 in the housing 12, and is secured at its upper end to a bell-shaped rotor 42, made of soft iron, by a press fit. A plurality of fan blades 44 are conventionally welded to the bell 42, but may be substituted by a plastic fan wheel, which hub may be easily fixed to the cylindrical portion of the bell 42 by heat clinching or adhesively. A retaining ring 15 is fitted into the groove of the shaft 43 to hold the rotor 40 in casing 11 while allowing free rotation in bearings 13 and 14. A permanent magnet 41 is located inside the rotor bell 42. The magnet 41 is attached adhesively or by other suitable means to the inner surface of the cylindrical portion of the bell 42. This magnet is a four-pole annular, or ring-shaped, permanent magnet with uniform radial magnetization forming four equal magnetized regions with alternating poles on the inner surface of the ring. The magnet 41 incorporates features for interacting with a reed switch, such novel features in one embodiment may be formed as tabs 45a and 45b, and slots 46a and 46b between them, extending beyond the edge of the bell 42 in a longitudinal direction, or in the direction of the axis of rotation.

All electronic components which are used in the embodiment shown are accommodated on the PCB plate 26, having a round shape with a central hole through which it is attached to the housing 12. Only a small number of components are needed to provide effective and efficient motor operation, including a single pole double throw reed switch 21, transistors 22 and 23, a Zener diode 24, and a resistor 25. The ends of the windings 32a-32d and 33a-33d, and two wires leading to a power source, are also connected to the plate 26.

Figure 3:
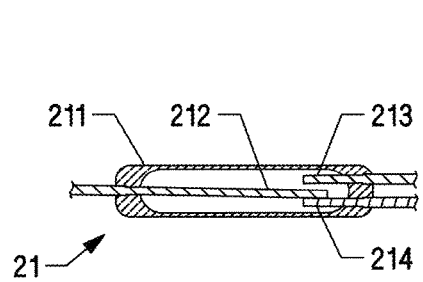
FIG. 3 is a section of the single pole double throw reed switch.

FIG. 3 schematically shows a section of a single pole double throw (SPDT) reed switch with Form C contacts. It consists of two fixed contacts 213 and 214, and a moving common contact 212, which is elastic, or has spring properties, placed inside a hermetically sealed glass tube 211 filled with an inert gas. Contacts 212, 213, and 214 may have rhodium or ruthenium coating to prolong the life of the reed switch. The SPDT reed switch has two stable states. In a substantially weak magnetic field, or when there is no magnetic field present, reed switch contacts 212-214 are normally closed, and 212-213 are normally open. In the presence of a sufficient magnetic field, exceeding the AT (Ampere-turn) value of the reed switch sensitivity, the contact 212 moves to connect to the contact 213, opening the connection 212-214, and then closing the connection 212-213. The SPDT reed switch therefore provides a desirable advantage of using a single part to control an operation of two independent motor windings.

Figure 4:
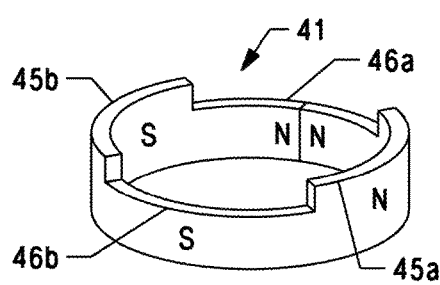
FIG. 4 is a three-dimensional perspective view of the permanent magnet of the rotor of the first embodiment.

The motor operation requires a sufficient magnetic field of either polarity applied to the reed switch at regular intervals with equal timing for both states of the reed switch contacts. In the prior art, separate magnets were used for interacting with the reed switch. FIG. 4 shows a new shape of the rotor permanent magnet 41 that is simple, inexpensive in manufacturing, and incorporates features for reed switch activation while keeping uniform main torque generating surface of the rotor magnet. Such features in the embodiment shown are formed as tabs, or ridges, 45a and 45b, with slots, or recesses, 46a and 46b, between them. The arc length of all tabs and slots is equal, covering exactly a quarter of the circle for the motor with four poles. The height of the tabs, measured longitudinally in the direction of the axis of rotation, needs to be sufficient to provide reliable reed switch operation, typically 3 to 6 mm. The magnet 41 may be made of hard ferrite material as a continuous ring. However, for lower manufacturing cost it could be constructed as a curved piece of a rubber magnet, i.e. a magnet strip made of rubber or plastic mixture with incorporated magnetic particles.

Figure 5:
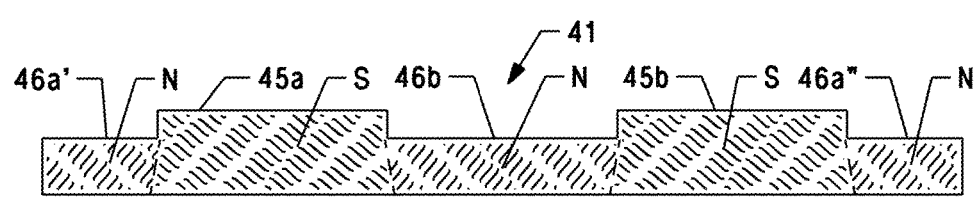
FIG. 5 is a view of the magnet of FIG. 4 shown in a flattened form for demonstration of the magnetization pattern.

FIG. 5 shows a rubber magnet in a flattened form as one piece, which can be later formed into a ring shape, and also illustrates the magnetization pattern. The areas with a substantially constant flux density for North and South poles are indicated by letters N and S, and schematically shown by hatching at different angles. Typically, the magnet is completely magnetized so as to leave no non-magnetized sectors between the poles of the magnet. However, it may include narrow gaps in the magnetization between the poles, and these gaps may be skewed at a small angle with respect to the axis of rotation, so magnetization is approximately trapezoidal where the magnetic flux within the region of each pole is effectively constant. Magnetization extends to the surfaces of the tabs entirely. FIG. 5 shows the tabs 45a and 45b extending South pole regions, but as the reed switch is an omnipolar device, North poles can be extended instead. The rotor structure, therefore, becomes very simple, and does not need an additional rotor position sensing magnet as required by the conventional technology.

Figure 6:
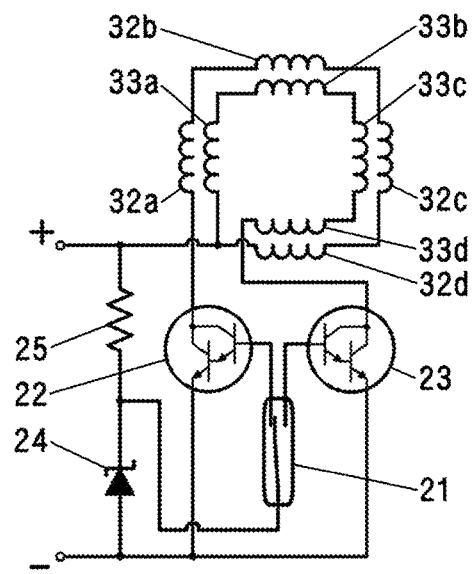
FIG. 6 is a schematic electrical diagram of the motor control circuit.

FIG. 6 shows a schematic electrical diagram of a motor control circuit. Fixed contacts of the reed switch 21 are connected to the bases of transistors 22 and 23. Collector of the transistor 22 is connected to the beginning of the winding 32a, and collector of the transistor 23 is connected to the end of the winding 33d. Windings 32a, 32b, 32c, and 32d are shown as connected in series but preferably consist of a single wire wound around each stator pole with an equal number of turns and alternating the direction of winding for each subsequent pole. Windings 33a, 33b, 33c, and 33d are wound in the same manner parallel to the 32a-32d winding. The end of winding 32d and the beginning of winding 33a are connected to the positive terminal. The common contact of the SPDT reed switch 21 is connected to the positive terminal through the resistor 25 which limits the current through the reed switch contacts. A Zener diode 24 controls the operating voltage on the reed switch.

Transistors 22 and 23, controlling their respective windings, may be of regular NPN type; however Darlington transistors, as shown in FIG. 6, are preferred. The Darlington transistors have a substantially higher amplification and therefore require a smaller current to operate. The resistor 25 may then have a higher value to decrease the base current, while limiting the voltage on the common contact of the reed switch 21 by the means of the Zener diode 24. This design combination provides favorable advantages in increasing substantially the life time and reliability of the reed switch. A smaller number of components as compared to conventional technology allows the electronic portion of the motor to be constructed in a simple and inexpensive manner.

When motor windings are de-energized; for example, when the motor is disconnected from the power source, the rotor in the first embodiment may stop in four stable rest positions. The external circumference of the stator pole shoes is assumed to have a variable, or non-uniform air gap as conventionally known, and stable positions are determined by the shape of the air gap and the magnetization of the rotor. This particular shape of the stator poles is not essential although a motor with a non-uniform air gap is preferred since the output torque will be more consistent throughout the rotation of the motor than with a uniform air gap motor.

Let it be assumed that in the stable rest position the rotor is oriented in a way where the slot, or recess, of the rotor magnet surface is facing the reed switch. The reed switch in this situation stays in its original state, and when the motor is connected to the power source, the small current flows through the base of the transistor 22. The transistor 22 becomes conductive and allows bigger current to flow through windings 32a-32d. As a result, it will create four magnetic poles on the stator with alternating polarities. The windings are wound in the direction where for each stator pole oppositely positioned poles of the rotor magnet are of the same polarity, causing each stator pole to repel them and attract the next alternatively magnetized poles of the rotor. The rotor turns about a quarter of the circle when the tab on the rotor magnet comes into near proximity of the reed switch where magnetic field becomes sufficient to switch its contacts. Windings 32a-32d are disconnected, and a small current now flows through the base of transistor 23, allowing the big collector current to flow through windings 33d-33a. As the windings 33d-33a are connected in reverse, they create four alternating magnetic poles with an opposite polarity compared to the previous pattern. Thus, the oppositely positioned poles of the stator and the rotor magnet will be again the same polarity and the process will continue as described above, providing rotational movement. If in the starting position the tab of the rotor magnet is opposing the reed switch, the current will flow through the winding 33d-33a first, creating the magnet pattern on the stator with the polarity which again is opposed the polarity of the rotor magnet. As a result, the motor always starts automatically in any stable angular position of the rotor producing a positive starting torque.

Commonly used semiconductor sensors, such as Hall Effect switches, react to the changes in the magnetic field almost instantly. The SPDT reed switch, however, requires some time for the movement of the common contact between the fixed contacts, that time is dependent on the stiffness, or elastic properties, of the common contact material. During this travel time there is no current supplied to stator windings, so pulse gaps occur. As the speed of the rotor grows these time gaps become substantially large compared to the time when the current flows through either winding, and at a full speed current flows only during a relatively short percentage of the rotor revolution. For the duration of the gaps in energization the particular shape of the stator poles, as presented in this embodiment, is known to generate an additional torque, or reluctance torque. Upon rotation of the rotor, magnetic energy is first stored and this magnetic energy is then released during interruption of the current through the stator windings, so that further driving torque is obtained from the motor. The reluctance torque in operation is complementary to the electromagnetically generated torque and thus supplements the electromagnetic torque. This ensures good efficiency and uniformity of the speed and torque, in spite of substantial gaps in power applied to the winding when operating at the desired speed. The advantage of utilizing the reed switch natural properties in a single part becomes evident, since conventional technology requires additional electronic components to create pulse gaps and fully utilize the reluctance torque.

It was expected that the motor of the present embodiment provides some increase in efficiency, as compared to conventional technology, due to a smaller current needed to operate the control circuit. However, it was found, surprisingly, that the motor on the single pole double throw reed switch achieves a significantly higher speed compared to the identically constructed motor utilizing a Hall Effect sensor. This unexpected advantage could be explained by the operation principles of the motor in conjunction with the reed switch properties. When the motor speed is below the optimal, longer pulses of electricity are applied to motor windings creating more torque, and the motor speed increases. If the motor speed increases over optimal, the electrical pulses become shorter, and since there is less driving energy applied to motor windings, the speed decreases. The rotor speed is synchronized with the natural frequency of the common reed switch contact acting as a mechanical oscillator. In operation, the motor is self-adjusting and rotates with the highest possible speed at minimal electrical pulse time lengths, thus providing a substantial increase in efficiency as compared to conventional technology.

The present embodiment practically eliminates a magnetic leakage flux which might be particularly important if the motor is used in combination with a magnetically sensitive apparatus. The number of North poles and South poles, arising at the circumference of the rotor upon energization of the respective filament, is identical, and the sum of the magnetic flux due to this energization of the respective filament is essentially zero. This creates a favorable environment, protecting the reed switch from inductive currents thus extending further its life time and reliability. The bell-shaped rotor closes the magnetic circuit for the ring magnet forming a magnetic return path.

Figure 7:
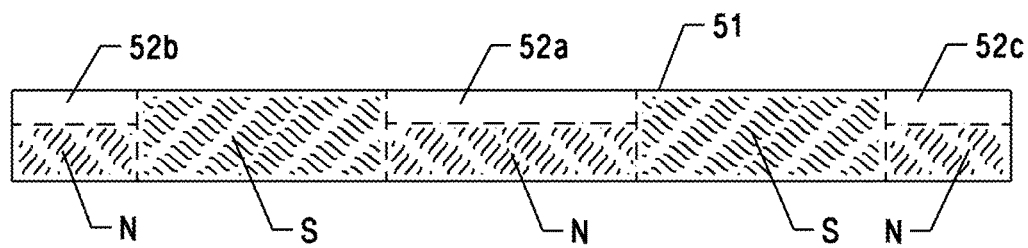
FIG. 7 is a variation of the rotor permanent magnet shown in a flattened form.

FIG. 7 shows a variation of the rotor permanent magnet in a flattened form. The magnet 51 is a rubber magnet manufactured as one rectangular piece, where, instead of having tabs and slots for interaction with the reed switch, it includes non-magnetized regions shown as 52a, and 52b-52c. The arc length of each magnetized and non-magnetized region at the edge facing the reed switch after forming into a ring shape is identical. FIG. 7 illustrates the magnet designed for the motor with four stator poles; however, this variation may be a preferred choice for the motors having only two stator poles as it simplifies the balancing of the rotor.

Figure 8:
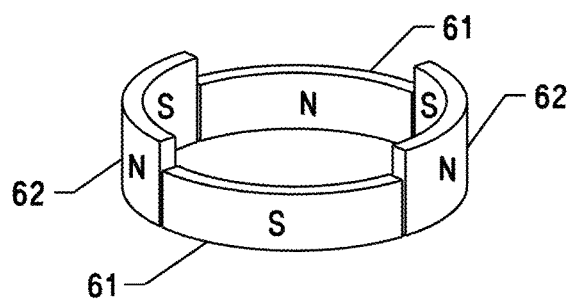
FIG. 8 is a three-dimensional perspective view of another variation of the rotor permanent magnet shown as an assembly of four arcuate magnets.

FIG. 8 presents another variation of the rotor permanent magnet structure shown as an assembly of four curved, or arcuate, magnets with uniform radial magnetization. For a four-pole motor it consists of two shorter magnets 61 and two longer magnets 62, measured longitudinally in the direction of axis rotation, with equal arc length for all four of them. Extended edges of the longer magnets interact with the reed switch in the same way as demonstrated in the first embodiment. Magnets 61 and 62 have opposite magnetization and may be made of an inexpensive hard ferrite material.

Figure 9:
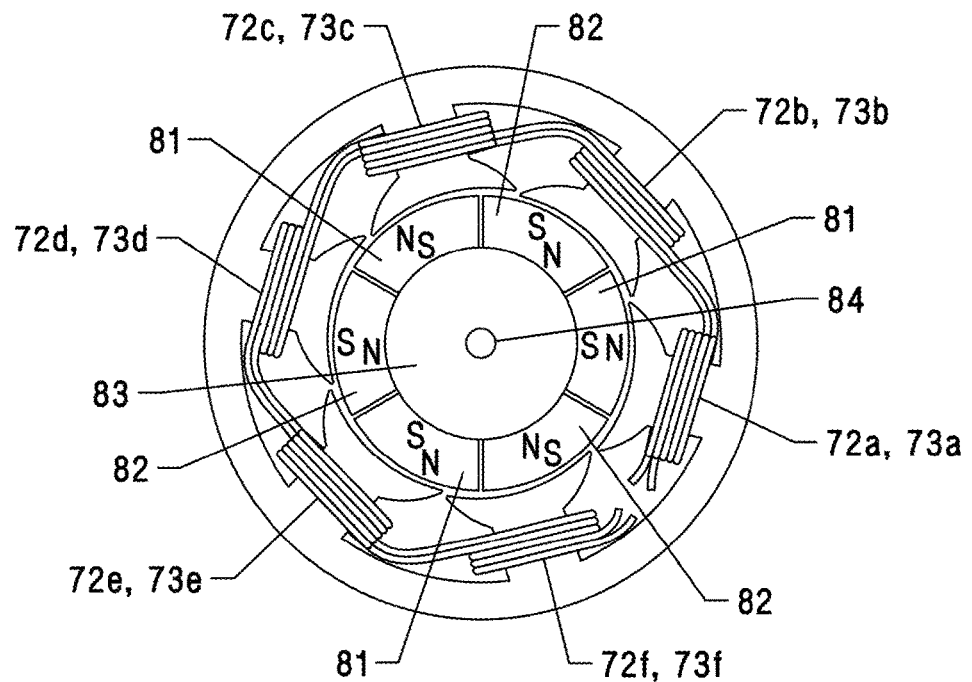
FIG. 9 is a top view of a rotor and a stator of another embodiment of the motor, having an internal rotor and six magnetic poles, as seen in the direction of the axis of rotation.
Figure 10:
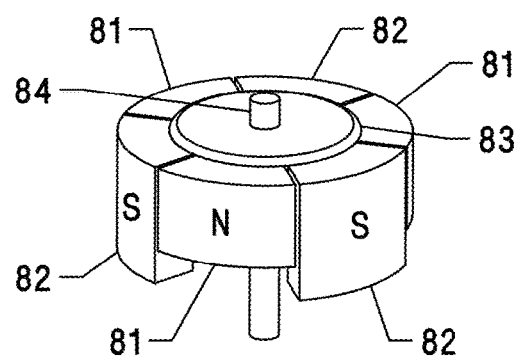
FIG. 10 is a three-dimensional perspective view of a rotor of the motor of FIG. 9.

FIG. 9 shows a top view of a rotor and a stator of another embodiment which has an inner rotor type and six magnetic poles, as seen in the direction of the axis of rotation. All stator poles are wound in the same manner as in the first embodiment with two continuous parallel conductors, alternating the direction of rotation for each subsequent pole. The windings are shown as 72a to 72f for the first filament, and 73a to 73f for the second. Again, only one single pole double throw reed switch, which is not shown, is needed to control the current through both windings. The rotor in this embodiment, as illustrated in FIG. 10, consists of the shaft 84, secured in the hub 83 by a press fit, and six arcuate magnets, marked as 81 and 82, adhesively attached to the hub. All six magnets have an identical arc length and uniform radial magnetization. Three magnets, indicated as 82, are longer than three magnets 81, measured in the direction of the axis of rotation, to provide features for the reed switch operation. Magnets 81 have an opposite polarity to magnets 82.

Other changes and modifications may be made without departing from the spirit and scope of the invention. It is to be understood, therefore, that the invention is not limited to any specific form or embodiment except insofar as such limitations are included in the appended claims.

What we claim is:

1. A brushless direct current motor comprising:
    an internal stator with an even plurality of magnetic poles with two windings on each pole, said windings of subsequent poles connected in series forming two parallel stator windings, wherein said poles have an alternating polarization;
    a hollow outer rotor with a ring-shaped permanent magnet structure having a uniform radial magnetization, rotatable relative to said stator, and located such that its magnetic field interacts with the electromagnetic field of said stator, wherein said magnet structure has a number of magnetic poles with alternating polarity equal to the number of magnetic poles on said stator, has substantially uninterrupted magnetic torque generating surface, and incorporates features to interact with a rotor position sensor;
    wherein said sensor is a single pole double throw magnetic reed switch, located approximately under said features of said magnet structure, and connected to amplifying means controlling the current pulses through the respective stator windings, and including means for limiting voltage and electric current through said switch.

2. The motor of claim 1, wherein said permanent rotor magnet is constructed as a single piece magnet, wherein said features for interacting with said reed switch are formed as tabs and slots of equal arc length, tabs extending longitudinally beyond the main torque generating surface in the direction of the axis of rotation with sufficient length to provide a reliable switching of said reed switch.

3. The motor of claim 2, wherein said rotor magnet is a rubber magnet, formed into a ring shape after magnetization.

4. The motor of claim 3, wherein said amplifying means are Darlington transistors.

5. The motor of claim 4, wherein said means for limiting the voltage and the current through said reed switch are a current limiting resistor and a Zener diode.

6. The motor of claim 5, wherein said stator windings are wound in bifilar form as two continuous parallel conductors with an equal number of turns on each pole, alternating the direction of rotation for each subsequent pole, said windings connected to the collectors of said transistors in reverse orientation such that opposite polarity is achieved upon energization of said respective windings.

7. The motor of claim 6, wherein said stator poles are constructed with a non-uniform air gap of different width along the arc length of the stator pole shoes to provide a complementary reluctance torque, whereby said reluctance torque supplements the electromagnetically generated torque.

8. The motor of claim 7, wherein the stator has four magnetic poles.

9. An axial airflow fan comprising the motor of claim 8.

10. The motor of claim 1, wherein said rotor magnet structure consists of an even number of arcuate magnets with an equal arc length, said magnets forming a complete circle, wherein half of the magnets are elongated in axial direction; longer and shorter magnets are uniformly magnetized with an opposite polarity, wherein said longer magnets extend sufficiently to interact with said switch and provide reliable switching thereof.

11. The motor of claim 1, wherein said rotor magnet structure is a single rectangular piece of a rubber magnet, wherein said features for interacting with said reed switch are constructed as rectangular magnetized and non-magnetized regions of equal arc length, measured along the curved edge of the magnet after forming it into a ring shape, and wherein the width of non-magnetized regions, measured in the direction of rotation, is sufficient to provide reliable switching of said reed switch.

12. A brushless direct current motor comprising:
    an external stator with an even plurality of magnetic poles with two windings on each pole, said windings of subsequent poles connected in series forming two parallel stator windings, wherein said poles have an alternating polarization;

an inner rotor with a permanent magnet structure having uniform radial magnetization, rotatable relative to said stator, and located such that its magnetic field interacts with the electromagnetic field of said stator, wherein said magnet structure has a number of magnetic poles with alternating polarity equal to the number of magnetic poles on the stator, has substantially uninterrupted magnetic torque generating surface, and incorporates features to interact with a rotor position sensor;

wherein said sensor is a single pole double throw magnetic reed switch, located approximately under said features of said magnet structure, and connected to amplifying means controlling the current pulses through the respective stator windings, and including means for limiting voltage and electric current through said switch.

13. The motor of claim 12, wherein said rotor magnet structure consists of an even number of arcuate magnets with an equal arc length, said magnets forming a complete circle, wherein half of the magnets are elongated in axial direction; longer and shorter magnets are uniformly magnetized with an opposite polarity, wherein said longer magnets extend to interact with said switch.

14. The motor of claim 13, wherein said amplifying means are Darlington transistors, and voltage and current through said reed switch are controlled by the current limiting resistor and the Zener diode.

15. The motor of claim 14, wherein said stator windings are wound in bifilar form, and said stator is constructed to have a variable gap between the inner circumference of the stator pole shoes and outer surface of said rotor magnet structure.

* * * * *